United States Patent [19]

Suzuki

[11] Patent Number: 5,105,083

[45] Date of Patent: Apr. 14, 1992

[54] THERMAL COPIER HAVING REVERSIBLY DRIVEN TRANSPORT BELT FOR DOCUMENT AND THERMOSENSITIVE SHEET

[75] Inventor: Shigeru Suzuki, Yokohama, Japan

[73] Assignee: Ricoh Company, Ltd., Tokyo, Japan

[21] Appl. No.: 630,506

[22] Filed: Dec. 20, 1990

[30] Foreign Application Priority Data

Dec. 20, 1989 [JP] Japan ............................. 1-146771[U]
Mar. 2, 1990 [JP] Japan ............................. 2-21186[U]

[51] Int. Cl.⁵ .............................................. G03C 5/16
[52] U.S. Cl. .................................... 250/319; 250/318
[58] Field of Search ................. 250/317.1, 319, 318, 250/316.1

[56] References Cited

U.S. PATENT DOCUMENTS 3,869,612  3/1975  Lenhard ..................... 250/319

Primary Examiner—Jack I. Berman
Assistant Examiner—James E. Beyer
Attorney, Agent, or Firm—Oblon, Spivak, McClelland, Maier & Neustadt

[57] ABSTRACT

A thermal copier for reproducing an image printed on a document on a thermosensitive sheet by transporting the document and sheet together and illuminating them by thermal rays that pass through the sheet. A belt for transporting the document and sheet to an exposing position has opposite ends, as distinguished from an endless belt. The opposite ends of the belt each is anchored to respective one of a reversible feed roller and a reversible take-up roller. The document and sheet are driven to the exposing position by the reversible rotation of the rollers.

14 Claims, 4 Drawing Sheets

THERMAL COPIER HAVING REVERSIBLY DRIVEN TRANSPORT BELT FOR DOCUMENT AND THERMOSENSITIVE SHEET

BACKGROUND OF THE INVENTION

The present invention relates to a thermal copier for reproducing an image printed on a document on a thermosensitive sheet overlapping the document by illuminating the document and sheet by thermal rays for which the sheet is transparent.

A thermal copying procedure uses a thermosensitive sheet and transports it to a predetermined exposing position together with a document carrying a desired image thereon. In the exposing position, the document is illuminated by ultraviolet rays that pass through the thermosensitive sheet. Then, the image of the document absorbs the thermal rays and is heated thereby, and the heat is transferred to the photosensitive sheet. As a result, a thermosensitive coloring agent provided on the sheet is heated to color in a pattern identical with the image of the document. To cause the coloring agent on the sheet to color due to the heat transferred from the document, it is necessary that the document and the sheet be pressed against each other at least in the exposing position. To meet this requirement, a copier adopting such a procedure has customarily been provided with a transport belt which transports a document and a thermosensitive sheet laid one upon the other to an exposing position and presses them against a platen there. The transport belt is heat-resistive and transparent for ultraviolet rays. In the exposing position, a lamp illuminates the document through the belt and thermosensitive sheet to heat an image printed on the document. The belt is usually implemented as an endless belt and driven by rollers. The simplest way to produce the endless belt is cutting a transparent film in an elongate strip configuration and then joining opposite ends of the strip to form a loop. However, the belt so produced is not usable in practice since the seam where the opposite ends are joined together obstructs exposure. It is therefore a common practice to use a belt produced by cutting an extruded tubular material to a predetermined width.

On the other hand, the endless belt for the above application should be resistive to heat, highly transparent for ultraviolet rays, and not easy to collect impurities. While a belt made of Teflon will meet such requirements, such a belt is little flexible and cannot be readily provided with an endless configuration by extrusion. The conventional transport belt is therefore expensive and inaccurate. Moreover, a Teflon belt having poor flexibility if apt to shift on the rollers in the axial direction of the latter. Although an arrangement for sensing the shift of the belt and then moving the belt in the axial direction has been proposed, it is not practicable without resorting to a complicated and expensive structure.

SUMMARY OF THE INVENTION

It is therefore an object of the present invention to provide a thermal copier implemented with an inexpensive and accurate belt having opposite ends, as distinguished from an endless belt.

It is another object of the present invention to provide a generally improved thermal copier.

A thermal copier for reproducing an image printed on a document on a thermosensitive sheet of the present invention comprises a platen, a transport belt having a length greater than the maximum document size available with the copier and movable in pressing contact with the platen for transporting a document and a thermosensitive sheet laid one upon the other to a predetermined exposing position, an exposing unit located at the exposing position, a reversible take-up roller to which one end of the transport belt is anchored, a reversible feed roller to which the other end of the transport belt is anchored, and a drive mechanism for causing each of the take-up roller and feed roller into reversible rotation.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
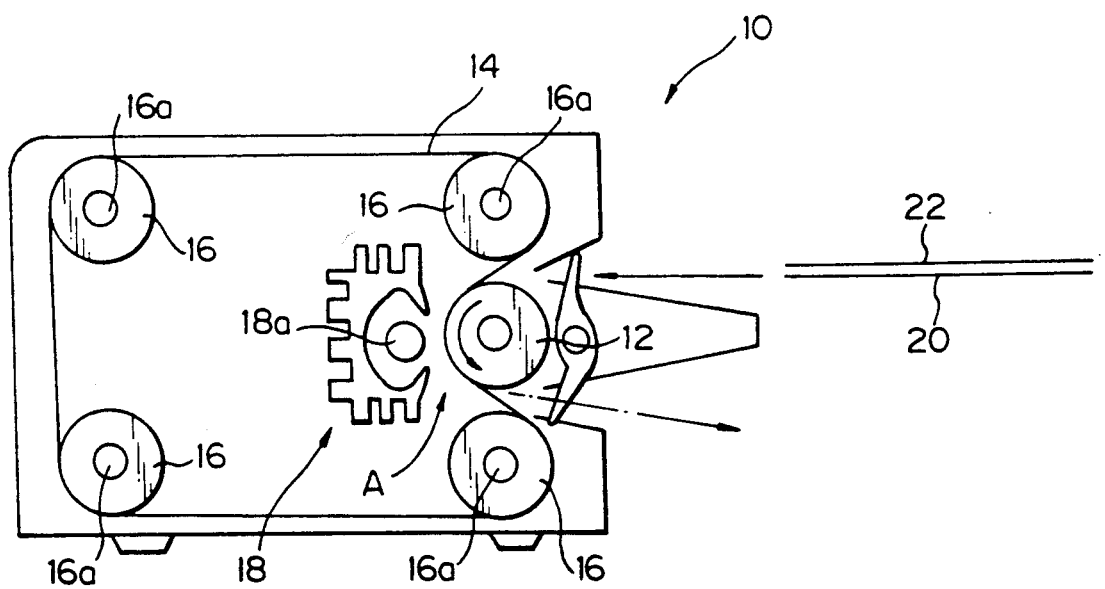
FIG. 1 is a sectional side elevation of a prior art thermal copier.

To better understand the present invention, a brief reference will be made to a prior art copier of the type to which the present invention pertains, shown in FIG. 1. As shown, the prior art copier, generally 10, has a platen 12 and a transport belt 14 which is driven by rollers 16 wrapping around the platen 12. The belt 14 is resistive to heat and transparent for ultraviolet rays. An exposing unit 18 is located to face the platen 12 with the intermediary of the belt 14 to define an exposing position A. A document 20 and a thermosensitive sheet 22 are driven into the exposing position A while overlapping each other. A lamp 18a included in the exposing unit 18 illuminates and heats the document 20 through the belt 14 and sheet 22, whereby an image printed on the document 20 is reproduced on the sheet 22.

The belt 14 implemented as an endless belt transports the overlapping document 20 and thermosensitive sheet 22 to the exposing position A while pressing itself against the platen 12. The simplest method of producing such an endless belt will be to join opposite ends of an elongate strip or webbing of transparent film by adhesive to form a loop. However, this kind of endless belt is not usable in practice since incomplete exposure occurs at the seam where the opposite ends are joined together. It has been customary, therefore, to use an endless belt produced by cutting an extruded tubular material to a predetermined width.

A prerequisite with the copier 10 using the endless transport belt 14 as stated above is that the belt 14 be prevented from shifting on the rollers 16 in the direction in which the shafts 16a of the rollers 16 extend (perpendicular to the sheet surface of FIG. 1). When the belt 14 is made of rubber or similar elastic material, the shift or dislocation thereof on the rollers 16 can be eliminated by a relatively simple implementation, e.g., increasing the diameter of each roller 16 at the center thereof or dimensioning the length of the roller 16 smaller than the width of the belt 14 so that opposite ends of the belt 14 may overhang. Another prerequisite is, however, that the belt 14 be resistive to heat, transparent for ultraviolet rays, and not easy to collect impurities. While this prerequisite may be met if use is made of a belt made of Teflon, such a belt is sparingly flexible and cannot be readily provided with an endless configuration by extrusion, as well known in the art. Moreover, the above-mentioned anti-shift implementation relying on the shape of the rollers 16 is not practicable with a belt made of Teflon or similar material which is little flexible. Although an arrangement for detecting a shift of the belt 14 on the rollers 16 and then correcting the position thereof has been proposed in the past, it needs a complicated structure and thereby increases the cost.

Figure 2:
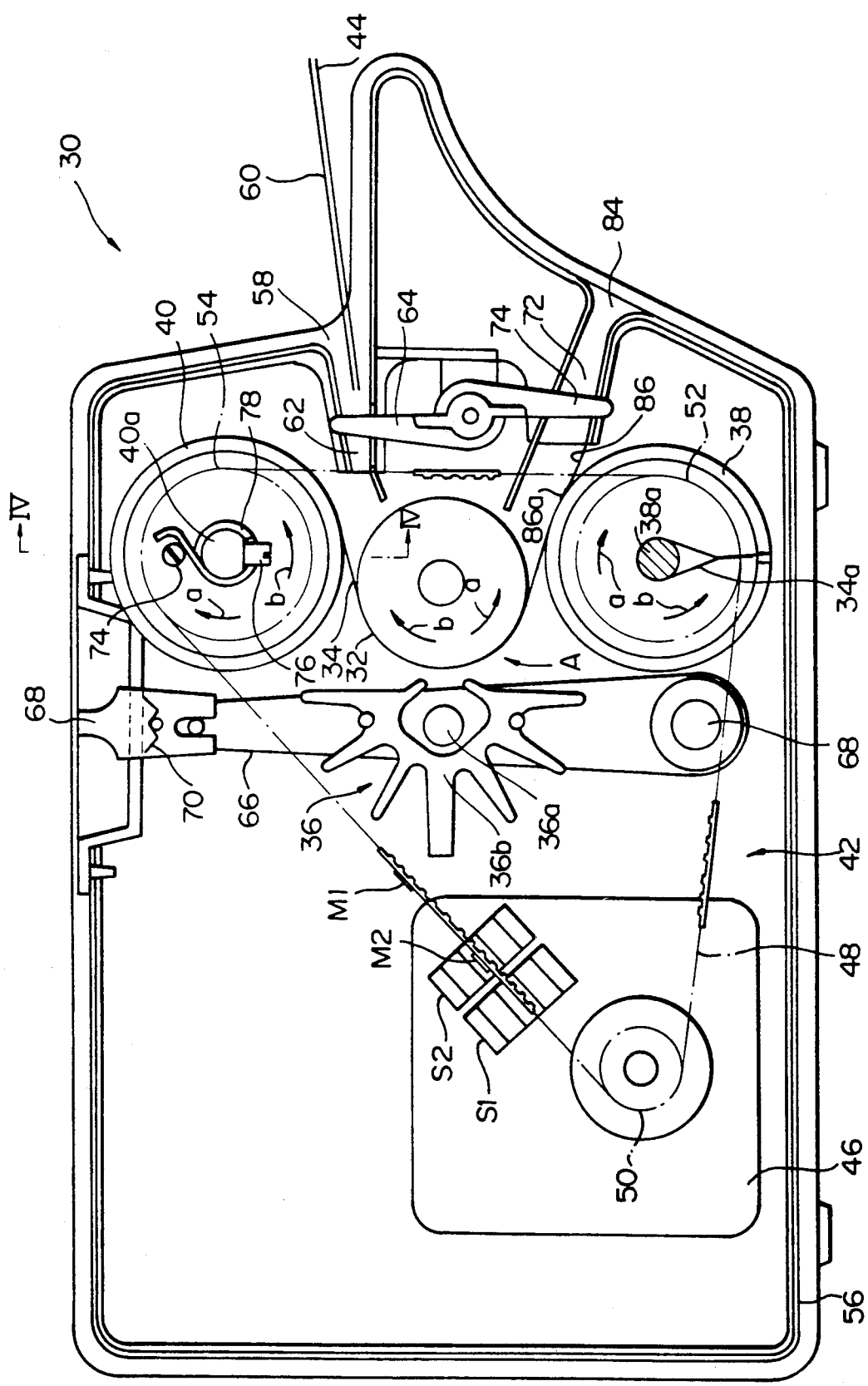
FIG. 2 is a sectional side elevation of a thermal copier embodying the present invention.

Referring to FIG. 2, a copier 30 embodying the present invention is shown and has a platen 32, a transport belt 34, an exposing unit 36 including a lamp 36a, a roller 38, a roller 40, and a drive system 42. The rollers 38 and 40 will hereinafter be referred to as a take-up roller and a feed roller, respectively, for reasons which will become apparent. In the illustrative embodiment, the belt 34 is implemented as a belt which is longer than the maximum size of a document 44 available with the copier 30, as distinguished from an endless belt. The belt 34 is heat resistive and transparent for ultraviolet rays and movable while wrapping around the platen 32, as in the prior art copier 10. An exposing position A is defined between the belt 34 and the platen 32. The belt 34 is made of Teflon which is highly heat-resistive and transparent for ultraviolet rays and not easy to collect impurities. The belt 34 is anchored at one end 34a to the take-up roller 38 and at the other end, not shown, to the feed roller 40. The take-up roller 38 and feed roller 40 each is reversibly rotated by the drive system 42. The drive system 42 has a motor 46, a timing belt 48, a drive pulley 50, a take-up pulley 52, and a feed pulley 54. The pulleys 52 and 54 are respectively mounted on a shaft 38a associated with the roller 38 and a shaft 40a associated with the roller 40.

In operation, a doocument 44 and a thermosensitive sheet 60 are laid one upon the other and inserted into the copier body 56 via a sheet inlet 58. Then, the document 44 and sheet 60 actuate a switch 64 which protrudes into a path 62 extending from the sheet inlet 58. The path 62 communicates to a path which is in the exposing position A and on the feed roller 40 side with respect to the exposing position A. As the switch 64 is actuated, the motor 46 is driven in the forward direction and the lamp 36a is turned on. A support lever 66 supports the lamp 36a and a reflector 36b associated therewith at substantially the intermediate between opposite ends thereof that faces the exposing position. The support lever 66 is pivotable about a shaft 68 which is studded the copier body 56. A knob 68 extends sideways out of the copier body 56 and is engaged with the free end of the support lever 66. The knob 68 is retained by a frictional slide spring 70 in such a manner as to be movable relative to the copier body 56. By shifting the knob 68, the operator can change the distance between the lamp 36a and the platen 32, i.e., the amount of light issuing from the lamp 36a as measured in the exposing position A, via the support lever 66.

Rotating in the forward direction, the motor 46a causes the platen 32, take-up roller 38 and feed roller 40 to rotate via the timing belt 48 and pulleys 50, 52 and 54, as indicated by an arrow a in the figure. As a result, the belt 34 initially reeled up on the feed roller 40 is sequentially reeled up by the take-up roller 38, driving the document 44 and thermosensitive sheet 60 into the exposing position A in cooperation with the platen 32. In the exposing position A, the lamp 36a heats the document 44 through the belt 34 and sheet 60 to reproduce an image printed on the document 44 on the sheet 60. After the exposure, the document 44 and sheet 60 are driven out together into a discharge path 72. A switch 74 is disposed in the path 72 and actuated by the document 44 and sheet 60. And mark M1 is provided on the timing belt 48 while a position sensor S1 is provided for controlling the end of the forward rotation of the driving system 42. When the switch 74 in the path 72 regains the original position thereof or when the position sensor S1 senses the mark M1 on the timing belt 48, the lamp 36a is turned off and the motor 46 is reversed.

On the reversal of the motor 46, the platen 32, take-up roller 38 and feed roller 40 are rotated in a direction indicated by an arrow b in FIG. 2 via the timing belt 48 and pulleys 50, 52 and 54. Consequently, the belt 34 having transported the document 44 and sheet 60 is again reeled up or rewound by the feed roller 40. The rotation speed of the motor 46 is controlled such that the rewinding speed of the belt 34 is higher than the feeding speed. In this manner, the belt 34 is restored to the initial position thereof to prepare for the next transporting movement. When a position sensor S2 for controlling the end of the reverse rotation of the drive system 42 senses a mark M2 also provided on the timing belt 48, the rotation of the motor 46 is stopped.

The timing belt 48 has a particular length selected such that it completes the feeding operation or the rewinding operation of the belt 34 within one rotation thereof. This, coupled with the fact that the reversible rotation of the take-up roller 38 and feed roller 40 is controlled by the sensors S1 and S2 respectively responsive to the marks M1 and M2, eliminates the need for a complicated and expensive mechanism for detection. In addition, when the document 44 and sheet 60 jam the transport path due to some cause and are not sensed, the belt 34 being reversed due to the sensing of the rotation of the drive system 42 as stated above successfully drives the jamming document 44 and sheet 60 backward to the sheet inlet 58. The position sensors S1 and S2 each is implemented as a reflection type photosensor while the marks M1 and M2 each is implemented with a reflective material.

The discharge path 72 communicates to a path defined in the exposing position A and on the take-up roller 5 side with respect to the exposing position A. When the switch 74 is actuated, the drive of the copier body 56 is interrupted and the lamp 36a is turned off.

As stated above, the belt 34 for transporting the document 44 and thermosensitive sheet 60 is constituted by a belt having ends 34a anchored to the take-up roller 38 and feed roller 40. As the rollers 38 and 40 are reversibly rotated, the belt 34 transports the document 44 and sheet 60. Such a belt 34, compared to a conventional endless belt, is inexpensive, accurate, and easy to produce. Moreover, the belt 34 does not need a countermeasure against shifting thereof on rollers, enhancing a simple and inexpensive structure. In a strict sense, the reciprocating speed of the belt 34 is not constant since it is reeled up more on one of the rollers 38 and 40 than on the other during the feeding operation or the rewinding operation.

The copier 30 of the type described is generally used to produce transparent document films applicable to an overhead projector (OHP). Usually, therefore, the maximum image forming area of the copier 30 corresponds to the letter size or the format A4, so that the maximum feed length is not greater than about 400 millimeters. Hence, assuming that the rollers 38 and 40 each has an outside diameter of 30 millimeters and the belt 34 is 100 microns thick, then the belt 34 is reeled by about four turns on each belt and the resultant increase or decrease in roller diameter is about 0.8 millimeters.

In order for the belt 34 to transport the document 44 and sheet 60 in cooperation with the platen 32, the belt 32 has to be held under a predetermined tension. Therefore, in the copier 30, an arrangement is made such that the position of the belt 34 held under such a tension relative to the rollers 38 and 40 is restricted by the drive mechanism 42. This, however, causes the tension of the belt 34 to change when it is wound more on one roller than on the other roller as mentioned above. The change in the tension of the belt 34 should not be neglected although the increase and decrease in roller diameter of the above-described degree may be neglected. In the light of this, the illustrative embodiment maintains the belt 34 under an adequate tension at all times between the rollers 38 and 40. Specifically, as shown in FIG. 2, screws 74 and 76 are respectively held in threaded engagement with the feed roller 40 and a shaft 40a on which the roller 40 is mounted. A tension spring 78 is preloaded between the screws 74 and 76 to constantly urge the roller 40 in a direction for taking up the belt 34, thereby applying a predetermined tension to the belt 34. This is successful in preventing the tension of the belt 34 from changing due to the change in roller diameter.

The copier 30 starts operating when the document 44 and thermosensitive sheet 60 are inserted and stops operating when they are discharged, as described above. In such a configuration, when the power source of the copier 30 is accidentally shut off while the belt 34 is in a rewinding movement, the belt 34 will start moving at a position deviated from an expected start position in the event of the next copying operation. To eliminate this, the copier 30 is provided with an initializing function, i.e., a function of reversing the rotation of the drive system 42 on the turn-on of the power source, not shown, and thereby automatically rewinding the belt 34 to the home position. While the lamp 36a has been described as being turned off when the document 44 and sheet 60 are fully discharged, the latter would prevent the former from being turned off in the event of a jam, inviting a fire or similar secondary trouble. In the light of this, the copier 30 is further provided with a lamp control circuit which turns on the lamp 36a while the belt 34 is in a feeding or forward movement and forcibly turns it off while the belt 34 is in a rewinding or backward movement even if the document 44 and sheet 60 have not been fully discharged.

The belt 34 suffers from irregular thermal stresses while being operated for a long time. The thermal stresses lowers the flatness of the belt 34 and thereby causes the belt 34 to fail to contact the entire area of the document 44 and sheet 60 under uniform pressure. Then, the heat absorbed by the document 44 cannot be uniformly transferred to the sheet 60 with the result that the coloring density of the sheet 60 is irregularly distributed. It is therefore necessary to replace the belt 34 at an adequate time. Since an endless belt heretofore used is not easy to replace, it has been customary to construct a lamp, rollers and other elements intervening between opposite runs of the belt into a unit and removably mount it on an apparatus body or, alternatively, to cause the apparatus body to cantilever the unit and then loosen and replace the belt at the free end of the unit. By contrast, in the illustrative embodiment, the belt 34 does not have to be constructed into a unit and, therefore, can be readily replaced by a simple and inexpensive construction.

Figure 3:
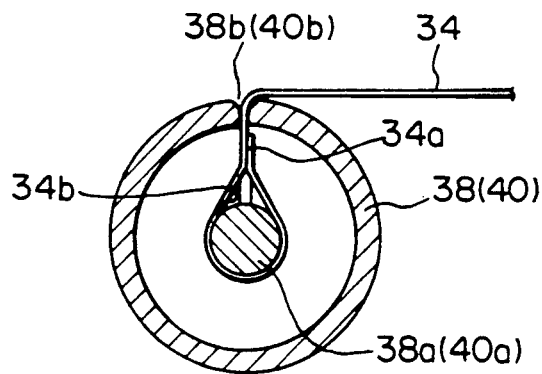
FIG. 3 is a section showing a belt support structure applicable to the embodiment.
Figure 4:
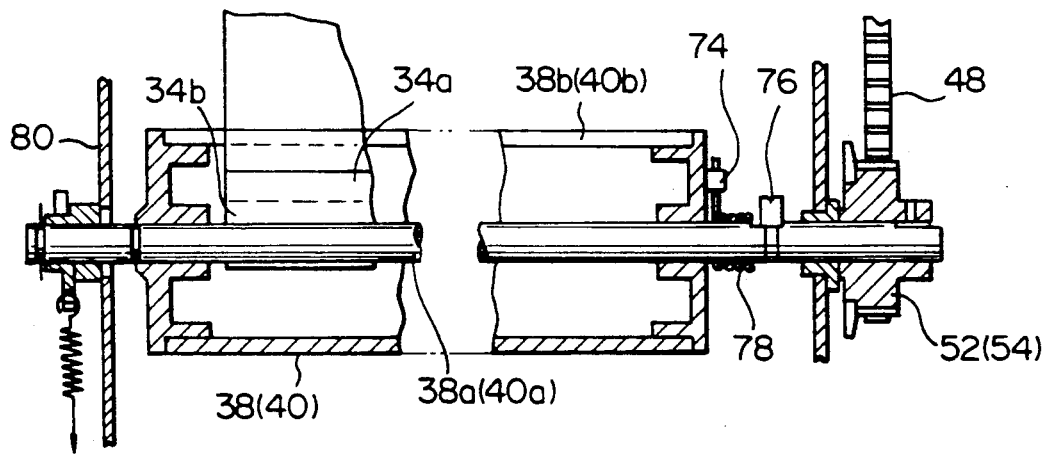
FIG. 4 is a section along line IV—IV of FIG. 2.

Referring to FIGS. 3 and 4, a specific belt support structure which facilitates the replacement of the belt 34 will be described. As shown, each of the rollers 38 and 40 has a cylindrical configuration and has a slot 38b or 40b extending along the axis 38a or 40a. Each end 34a of the belt 34 is turned up and fused to form a loop 34b. The loops 34b so formed at opposite ends of the belt 34 are respectively coupled over the shafts 38a and 40a together with the rollers 38 and 40. The slots 38b and 40b each has a length slightly greater than the width of the belt 34. This kind of configuration allows the belt 34 to be mounted and dismounted more easily than the conventional unit configuration.

Figure 5:
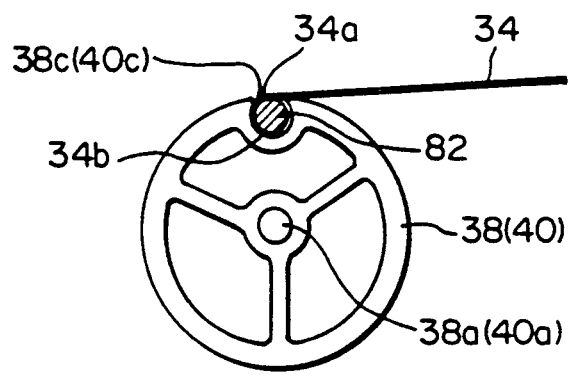
FIG. 5 is a section showing another specific support structure.
Figure 6:
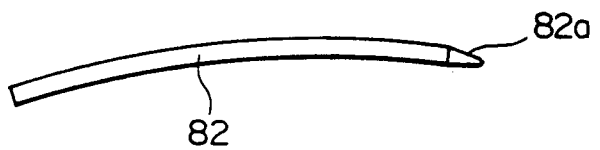
FIG. 6 is a side elevation of a pin included in the structure of FIG. 5.

In the structure shown in FIGS. 3 and 4, since the loops 34b of the belt 34 are coupled over the shafts 38a and 40a, the belt 34 cannot be mounted or dismounted unless at least one of opposite side panels 80 to which the shafts 38a and 40a are journalled is removed. FIG. 5 shows another specific belt support structure which further enhances the easy replacement of the belt 34. In FIG. 5, the roller 38 or 40 is formed with a slot-like channel 38c or 40c in a suitable portion of the periphery thereof. The loop 34b of the belt 34 is put in the channel 38c or 40c, and then a pin 82 is inserted into the loop 34b to fix it in place. The rollers 38b and 40 to which the structure of FIG. 5 is applicable each is produced by extruding aluminum, and the shafts 38a and 40a each is press-fitted in a bore formed in the frame of the associated roller. As shown in FIG. 6, the pin 82 is tapered at one end 82a which will be inserted into the bore channel 38c or 40c first. The tapered end 82a not only facilitates the insersion of the pin 82 but also protects the loop 34b of the belt 34 from damage. As also shown in FIG. 6, the pin 82 is curved and, when inserted in the channel 38c or 40c, prevented from slipping out due to resiliency. This eliminates the need for a ring or similar extra member for insuring the position of the pin 82 in the channel 38c or 40c.

In any of the specific structures stated above, the belt 34 can be mounted and dismounted without the side panel 80 being removed or the rollers 38 and 40 being removed from the copier body 56. All that is required is inserting or removing the pin 82.

The marks M1 and M2 for detecting the time when the operation for rewinding the belt 34 begins and ends are provided on the timing belt 48, as stated earlier. The marks M1 and M2 may be provided on any other desired rotatable (or movable) member so long as the belt 34 is capable of completing a movement in one direction before the member rotates one full rotation. However, the problem with the marks M1 and M2 provided on a rotary member such as the timing belt 48 is that the reversible rotation of the motor 46 is controlled by the indirect detection of the take-up or rewind position of the belt 34. Specifically, when the belt 34 is replaced, the angular positions of the rollers 38 and 40 have to be adjusted relative to the drive system 42 to match the position of the belt 34 and marks M1 and M2 to each other. To eliminate such troublesome adjustment, the marks M1 and M2 may be provided on the belt 34. Then, the motor 46 will be controlled with the position of the belt 34 being directly detected, so that the above-mentioned adjustment is not necessary.

Figure 7:
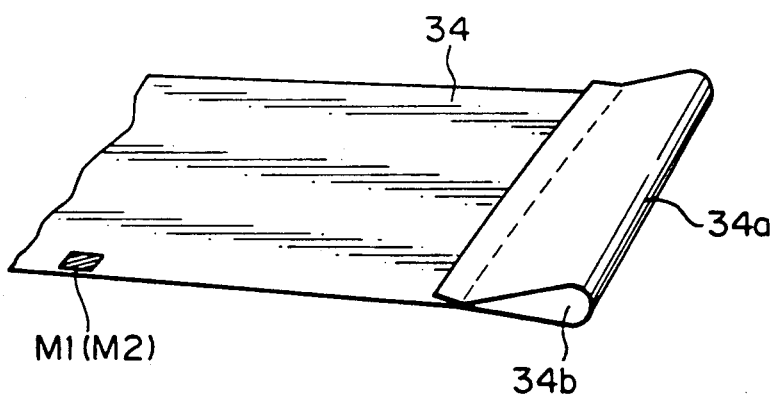
FIG. 7 is a perspective view of an end portion of a transport belt having an alternative configuration.

As shown in FIG. 7, the marks M1 and M2 are positioned in a marginal area of the belt 34 outside of an image forming area, i.e., in an area which does not effect the copying operation. The marks M1 and M2 each may be implemented with an opaque piece of Teflon, in which case the sensors S1 and S2 each will be constituted by a transmission type photointerrupter. It is necessary that the marks M1 and M2 be resistive to heat generated by the lamp 36a. Preferably, therefore, the marks M1 and M2 are made of the same material as the belt 34.

In the prior art copier 10 shown in FIG. 1, the endless belt 14 prevents the document 20 and sheet 22 being transported from reaching the position where the lamp 18a is located. In the illustrative embodiment, when the document 44 and sheet 60 being driven toward an outlet 84 are not separated from the belt 34, it is likely that they wrap around the take-up roller 38 or, in the worst case, enter the space where the lamp 36a is located and is burned thereby. Moreover, when the document 44 is a reproduction carrying a dry toner image thereon and inserted into the copier 30 without being accompanied by the sheet 60, the toner on the document 44 is apt to melt during exposure and stick to the belt 32.

In the light of the above, as shown in FIG. 2, the copier 30 has a separating member 86 contacting the transporting surface of the belt 34 at the free end 86a thereof. The separating member 86 extends along the discharge path 72 to which the sheet 60 will be discharged. The separating member 86 forcibly separates the document 44 being transported by the belt 34 in the discharge path 72 and thereby discharges the document 44 via the outlet 84. The separating member 86 may be constituted by a thin sheet of stainless steel, a polyimide sheet or similar elastic material so as to absorb the displacement of the end 86a of the member 86 ascribable to the varying diameter of the roller 38.

In summary, it will be seen that the present invention provides a thermal copier implemented with a belt which is less expensive, more accurate, and easier to produce than a conventional endless belt. Such a belt does not need a special implementation against shifts thereof, simplifying the construction and cutting down the cost of the copier.

Various modifications will become possible for those skilled in the art after receiving the teachings of the present disclosure without departing from the scope thereof.

What is claimed is:

1. A thermal copier for reproducing an image printed on a document on a thermosensitive sheet, comprising:
   a platen;
   a transport belt having a length greater than the maximum document size available with said copier and movable in pressing contact with said platen for transporting a document and a thermosensitive sheet laid one upon the other from a sheet inlet to a sheet outlet and passing said document and said thermosensitive sheet through a predetermined exposing position;
   exposing means located at said exposing position;
   a reversible take-up roller to which one end of said transport belt is anchored;
   a reversible feed roller to which the other end of said transport belt is anchored, said transport belt having a starting position wherein said transport belt is wound on said feed roller; and
   drive means for rotating each of said take-up roller and said feed roller in a first direction to advance said document and said thermosensitive sheet from said sheet inlet to said sheet outlet by winding said transport belt onto said take-up roller, and for rotating each of said take-up roller and said feed roller in a second direction after said document and said thermosensitive sheet have reached said sheet outlet, thereby returning said transport belt to said starting position to receive a next document and a next thermosensitive sheet from said sheet inlet.

2. A copier as claimed in claim 1, further comprising separating means extending along a discharge path to which the thermosensitive sheet will be discharged, and contacting a transporting surface of said transport belt at a free end thereof.

3. A copier as claimed in claim 1, wherein said transport belt is turned up and fused at opposite ends thereof to form loops, said take-up roller and said feed roller each comprising an engaging portion with which one of said loops engages and a shaft removably inserted in said one loop having been engaged with said engaging portion.

4. A copier as claimed in claim 1, further comprising position sensors for controlling positions in which said take-up roller and said feed roller driven by said drive means end reversible rotations thereof.

5. A copier as claimed in claim 4, wherein said transport belt comprises transparent heat-resistive marks positioned in a non-image forming area and at opposite ends of said transport belt to be sensed by said position sensors.

6. A copier as claimed in claim 1, further comprising a timing belt having a predetermined length which causes an operation for taking up or rewinding said transport belt to be completed before said timing belt completes one rotation.

7. A copier as claimed in claim 6, further comprising position sensors for controlling positions where said timing belt driven by said drive means should end reversible rotation thereof.

8. A copier as claimed in claim 7, wherein said timing belt comprises marks to be sensed by said position sensors for controlling reversible rotation of said take-up roller and said feed roller.

9. A copier as claimed in claim 1, wherein:
   said take-up roller is mounted on a shaft which is provided with a take-up pulley;
   said feed roller is mounted on a shaft which is provided with a feed pulley; and
   said drive means includes a timing belt which drivably engages both said take-up pulley and said feed pulley.

10. A copier as claimed in claim 9, wherein said timing belt also engages a drive pulley which is driven by a reversible drive motor.

11. A copier as claimed in claim 10, wherein said timing belt includes a timing mark and said copier includes a sensor for sensing said timing mark, and wherein the rotation of said drive motor is reversed when said sensor detects said timing mark.

12. A copier as claimed in claim 11, further comprising a discharge path for receiving said document and said thermosensitive sheet from said transport belt, wherein said discharge path includes a switch for turning off said exposing means.

13. A copier as claimed in claim 9, further comprising a tension spring constantly urging said feed roller in said second direction to maintain said transport belt in tension.

14. A copier as claimed in claim 1, wherein said transport belt is made of a polytetrafluoroethylene material, such as that known by the trademark TEFLON.

* * * * *